(12) United States Patent
Bott et al.

(10) Patent No.: US 9,568,046 B2
(45) Date of Patent: Feb. 14, 2017

(54) MAGNETIC RADIAL BEARING HAVING SINGLE SHEETS IN THE TANGENTIAL DIRECTION

(71) Applicant: Siemens Aktiengesellschaft, München (DE)

(72) Inventors: Erich Bott, Hollstadt (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/364,586

(22) PCT Filed: Nov. 19, 2012

(86) PCT No.: PCT/EP2012/072960
§ 371 (c)(1),
(2) Date: Jun. 11, 2014

(87) PCT Pub. No.: WO2013/087360
PCT Pub. Date: Jun. 20, 2013

(65) Prior Publication Data
US 2014/0339941 A1    Nov. 20, 2014

(30) Foreign Application Priority Data
Dec. 12, 2011   (EP) .................................. 11192976

(51) Int. Cl.
*F16C 32/04*   (2006.01)
*H02K 3/52*    (2006.01)
*H02K 7/09*    (2006.01)

(52) U.S. Cl.
CPC ......... *F16C 32/0406* (2013.01); *F16C 32/048* (2013.01); *F16C 32/0461* (2013.01);
(Continued)

(58) Field of Classification Search
CPC .......... H02K 3/524; H02K 3/525; H02K 7/09; F16C 32/0406; F16C 32/0408; F16C 32/041; F16C 32/0412; F16C 32/0444
(Continued)

(56) References Cited

U.S. PATENT DOCUMENTS 3,707,924 A * 1/1973 Barthalon et al. ............. 104/290
3,803,431 A * 4/1974 Inaba ..................... H02K 37/08
310/268
(Continued)

FOREIGN PATENT DOCUMENTS

CN       101025199 A    8/2007
CN       101539167 A    9/2009
(Continued)

OTHER PUBLICATIONS

Igarashi, English Translation of JP 4234831, Dec. 19, 2008.*
(Continued)

*Primary Examiner* — Terrance Kenerly
*Assistant Examiner* — Rashad Johnson
(74) *Attorney, Agent, or Firm* — Henry M. Feiereisen LLC

(57) ABSTRACT

The invention relates to an easily mountable and highly dynamic radial bearing. According to the invention, a magnetic radial bearing for the rotatable mounting of a rotor (3) is provided, having a stator (2) that comprises several coil assemblies (6). The coil assemblies (6) are arranged around an axis (1) of the radial bearing in a circumferential direction. Each of the coil assemblies (6) has a laminated core (7) having single sheets. Each of the coil assemblies (6) further has an axial field coil (11) that is wound around the corresponding laminated core (7). The single sheets are stacked in the tangential direction in every laminated core (7).

9 Claims, 6 Drawing Sheets

(52) U.S. Cl.
CPC .......... *F16C 32/041* (2013.01); *F16C 32/044* (2013.01); *F16C 32/0408* (2013.01); *F16C 32/0412* (2013.01); *F16C 32/0444* (2013.01); *H02K 3/524* (2013.01); *H02K 3/525* (2013.01); *H02K 7/09* (2013.01)

(58) Field of Classification Search
USPC ........................................................ 310/90.5
See application file for complete search history.

(56) References Cited

U.S. PATENT DOCUMENTS

| | | | | |
|---|---|---|---|---|
| 4,470,644 | A | * | 9/1984 | Weisser .................. 310/90.5 |
| 4,473,259 | A | * | 9/1984 | Goldowsky .............. 310/90.5 |
| 4,983,870 | A | | 1/1991 | McSparran |
| 5,471,105 | A | * | 11/1995 | Clifton et al. ............ 310/90.5 |
| 5,880,546 | A | * | 3/1999 | Marroux et al. .......... 310/90.5 |
| 6,131,459 | A | * | 10/2000 | Seale et al. .................. 73/633 |
| 6,169,350 | B1 | * | 1/2001 | Yang ...................... H02K 1/14 310/13 |
| 6,483,221 | B1 | | 11/2002 | Pawellek et al. |
| 6,628,031 | B2 | | 9/2003 | Vollmer |
| 6,768,238 | B2 | | 7/2004 | Knauff et al. |
| 6,812,612 | B2 | | 11/2004 | Schunk et al. |
| 6,858,965 | B2 | | 2/2005 | Mueller et al. |
| 6,943,467 | B2 | | 9/2005 | Potoradi et al. |
| 7,141,905 | B2 | | 11/2006 | Vollmer |
| 7,285,883 | B2 | | 10/2007 | Bott et al. |
| 7,501,782 | B2 | * | 3/2009 | Buhler ............... F16C 32/0442 310/90.5 |
| 7,564,158 | B2 | | 7/2009 | Huth et al. |
| 7,692,356 | B2 | | 4/2010 | Bott et al. |
| 7,705,507 | B2 | | 4/2010 | Vollmer |
| 7,709,984 | B2 | | 5/2010 | Braun et al. |
| 7,732,967 | B2 | | 6/2010 | Vollmer et al. |
| 7,755,315 | B2 | | 7/2010 | Bott et al. |
| 7,777,373 | B2 | | 8/2010 | Bott et al. |
| 7,859,160 | B2 | | 12/2010 | Vollmer |
| 7,893,569 | B2 | | 2/2011 | Jajtic et al. |
| 7,915,777 | B2 | | 3/2011 | Vollmer |
| 7,977,826 | B2 | | 7/2011 | Vollmer et al. |
| 8,026,640 | B2 | | 9/2011 | Bott et al. |
| 8,035,371 | B2 | | 10/2011 | Vollmer |
| 8,063,517 | B2 | | 11/2011 | Bott et al. |
| 8,115,360 | B2 | | 2/2012 | Vollmer |
| 8,134,273 | B2 | | 3/2012 | Vollmer et al. |
| 8,193,679 | B2 | * | 6/2012 | Calley .................... H02K 1/246 310/181 |
| 8,203,243 | B2 | * | 6/2012 | Kuwata ............... F16C 32/0451 310/90.5 |
| 8,227,951 | B2 | | 7/2012 | Grossmann et al. |
| 8,378,541 | B2 | | 2/2013 | Vollmer |
| 8,441,158 | B2 | | 5/2013 | Vollmer |
| 8,520,386 | B2 | | 8/2013 | Bott et al. |
| 8,674,560 | B2 | | 3/2014 | Budde et al. |
| 2003/0173853 | A1 | | 9/2003 | Knauff et al. |
| 2003/0197440 | A1 | * | 10/2003 | Hasegawa et al. ........ 310/90.5 |
| 2004/0061404 | A1 | * | 4/2004 | Fujii et al. ................ 310/216 |
| 2005/0012413 | A1 | | 1/2005 | Bott et al. |
| 2005/0143527 | A1 | | 6/2005 | Bott |
| 2005/0200217 | A1 | * | 9/2005 | Kozoriz .............. F16C 32/0436 310/90.5 |
| 2005/0231060 | A1 | | 10/2005 | Vollmer |
| 2006/0219880 | A1 | | 10/2006 | Braun et al. |
| 2007/0040466 | A1 | | 2/2007 | Vollmer |
| 2007/0114861 | A1 | | 5/2007 | Bott et al. |
| 2007/0170792 | A1 | | 7/2007 | Bott et al. |
| 2007/0257566 | A1 | | 11/2007 | Vollmer |
| 2007/0257575 | A1 | | 11/2007 | Vollmer |
| 2008/0169718 | A1 | | 7/2008 | Bott et al. |
| 2008/0185931 | A1 | | 8/2008 | Vollmer |
| 2008/0289440 | A1 | | 11/2008 | Vollmer et al. |
| 2008/0315704 | A1 | | 12/2008 | Vollmer |
| 2009/0009114 | A1 | | 1/2009 | Vollmer |
| 2009/0015080 | A1 | | 1/2009 | Vollmer et al. |
| 2009/0072634 | A1 | | 3/2009 | Vollmer |
| 2009/0152959 | A1 | | 6/2009 | Vollmer |
| 2009/0152976 | A1 | | 6/2009 | Bott et al. |
| 2009/0160283 | A1 | | 6/2009 | Bott et al. |
| 2009/0184602 | A1 | | 7/2009 | Braun et al. |
| 2009/0206681 | A1 | | 8/2009 | Jajtic et al. |
| 2009/0212644 | A1 | | 8/2009 | Bott et al. |
| 2009/0251013 | A1 | | 10/2009 | Bott et al. |
| 2009/0295251 | A1 | | 12/2009 | Vollmer et al. |
| 2009/0315421 | A1 | * | 12/2009 | Onuma ................ F16C 32/048 310/90.5 |
| 2009/0315424 | A1 | | 12/2009 | Vollmer |
| 2009/0322174 | A1 | | 12/2009 | Grossmann et al. |
| 2010/0000830 | A1 | | 1/2010 | Budde et al. |
| 2010/0013332 | A1 | | 1/2010 | Vollmer |
| 2010/0013333 | A1 | | 1/2010 | Vollmer |
| 2010/0013341 | A1 | | 1/2010 | Vollmer |
| 2010/0052466 | A1 | | 3/2010 | Vollmer et al. |
| 2010/0072846 | A1 | * | 3/2010 | Saito .................. F16C 32/0459 310/90.5 |
| 2010/0127589 | A1 | * | 5/2010 | Kummeth ........... F16C 32/0438 310/90.5 |
| 2010/0133940 | A1 | | 6/2010 | Grossmann et al. |
| 2010/0264770 | A1 | | 10/2010 | Braun et al. |
| 2010/0319442 | A1 | | 12/2010 | Bott |
| 2011/0006617 | A1 | | 1/2011 | Budde et al. |
| 2011/0234031 | A1 | * | 9/2011 | Kato ............................... 310/71 |
| 2011/0242760 | A1 | | 10/2011 | Bott et al. |
| 2011/0302918 | A1 | | 12/2011 | Vollmer et al. |
| 2012/0025654 | A1 | | 2/2012 | Bach et al. |
| 2012/0038228 | A1 | | 2/2012 | Vollmer |
| 2012/0146435 | A1 | | 6/2012 | Bott et al. |
| 2013/0127264 | A1 | | 5/2013 | Fick et al. |
| 2013/0127265 | A1 | | 5/2013 | Fick et al. |
| 2013/0127267 | A1 | | 5/2013 | Fick et al. |
| 2014/0097782 | A1 | * | 4/2014 | Vollmer .............. F16C 32/0453 318/504 |

FOREIGN PATENT DOCUMENTS

| | | | |
|---|---|---|---|
| JP | 4234831 | B2 * | 3/2009 |
| RU | 1838682 | A3 | 8/1993 |
| RU | 2037684 | C1 | 6/1995 |
| SU | 981729 | A1 | 12/1982 |
| WO | WO 9701882 | A1 * | 1/1997 |
| WO | WO 2006074070 | A2 | 7/2006 |

OTHER PUBLICATIONS

Gerhard Schweitzer, Eric H. Maslen: Magnetic Bearings—Theory, Design, and Application to Rotating Machinery; pp. 82-84 + 96; 2009, Springer-Verlag; 2009.

Chinese Search Report issued on Sep. 6, 2015 with respect to counterpart Chinese patent application 201280061319.4.

Translation of Chinese Search Report issued on Sep. 6, 2015 with respect to counterpart Chinese patent application 201280061319.4.

* cited by examiner

MAGNETIC RADIAL BEARING HAVING SINGLE SHEETS IN THE TANGENTIAL DIRECTION

CROSS-REFERENCES TO RELATED APPLICATIONS

This application is the U.S. National Stage of international Application No. PCT/EP2012/072960, filed Nov. 19, 2012, which designated the United States and has been published as International Publication No. WO 2013/087360 and which claims the priority of European Patent Application, Serial No. 11192976.6, filed Dec. 12, 2011, pursuant to 35 U.S.C. 119(a)-(d).

BACKGROUND OF THE INVENTION

The present invention relates to a magnetic radial bearing for the rotatable mounting of a rotor having a stator that comprises several coil assemblies, wherein the coil assemblies are arranged around an axis of the radial bearing in a circumferential direction, each of the coil assemblies has a laminated core with single sheets and each of the coil assemblies has a coil that is wound around the corresponding laminated core.

With a conventional magnetic radial bearing, the stator comprises coils directed radially inward toward the shaft to be mounted. This means the coil axes extend substantially radially.

Radial magnetic bearings with axial coils are also known from the book "Magnetic Bearings" by Gerhard Schweitzer and Eric H. Maslen, Springer Verlag Berlin, 2009, XV, pages 82 to 84 and 96. This means that the coil axes extend in parallel to the bearing axis. Correspondingly, the flux guidance in both the coils and the rotor takes place substantially in the axial direction.

Magnetic radial bearings have to be able to compensate highly dynamic disturbances. At the same time, the force should follow the current with the shortest possible delay.

SUMMARY OF THE INVENTION

Hence, the object of the present invention consists in improving the dynamics of a magnetic radial bearing.

According to the invention, this object is achieved by a magnetic radial bearing for the rotatable mounting of a rotor having a stator comprising several coil assemblies, wherein the coil assemblies are arranged around an axis of the radial bearing in a circumferential direction, each of the coil assemblies has a laminated core with single sheets and each of the coil assemblies has a coil that is wound around the corresponding laminated core, wherein the single sheets are stacked in the circumferential direction in every laminated core and wherein the coils are each embodied as an axial field coil.

In an advantageous way, therefore, the magnetic radial bearing comprises coils in axial direction on laminated cores, the single sheets of which are stacked in the tangential direction. This keeps the eddy current density in the magnetic circuit low. This enables the force to follow the current very quickly which achieves very dynamic radial bearing behavior. At the same time, the lamination is obviously also has the function of guiding the magnetic field and, due to the positioning in the radial direction distributed over the circumference, of absorbing the bearing forces.

Preferably, the magnetic radial bearing has four coil assemblies facing each other in pairs. This enables satisfactory mounting to be achieved with a simple design.

In addition, it is also advantageous for each laminated core to have a U-shaped cross section in an axially extending cutting plane, wherein said U-shaped cross section has two sides and a section connecting the sides. Here, the respective coil is wound around a part of the laminated core in a direction perpendicular to the axis of the radial bearing and the part of the laminated core is assigned to the connecting section of the cross section. This enables a virtually enclosed magnetic circuit to be implemented via any possible shaft to be mounted.

Each laminated core can be arched in the circumferential direction. In the circumferential direction, it preferably has a contour at a constant distance to a prespecified shaft to be mounted. Then, the coil assembly overall has an approximately kidney-shaped form.

In addition, each coil assembly can comprise a coil carrier or former, which is arranged around the respective laminated core. A coil carrier of this kind endows the respective coil with the desired hold. The coil carrier can be separable. It should in particular consist of at least two parts which can be easily plugged onto a prefabricated laminated core. For example, division into two such that a radially external coil carrier part and a radial internal coil carrier part face each other is recommended.

In a special embodiment, the coil carrier can also be sprayed onto the respective laminated core. It is also, for example, possible for the coil carrier to be mounted on the laminated core without high production costs.

In a further embodiment, the magnetic radial bearing can comprise an annular housing in which the coil assemblies are secured. It addition to being used to secure the coil assemblies, the annular housing can also provide protection against environmental influences.

The housing can be in two parts, wherein the two housing parts are also annular. Hence, the housing can be assembled in the axial direction, wherein the coil assemblies are held between the two housing halves.

A separate supporting ring for the radial support of the coil assemblies can be attached to the inner circumference of the annular housing. In addition to supporting functions, this supporting ring can also take on insulating functions if a suitable material is selected.

BRIEF DESCRIPTION OF THE DRAWING

The present invention is now explained in more detail with reference to the attached drawings, which show in.

DETAILED DESCRIPTION OF PREFERRED EMBODIMENTS

The exemplary embodiments described in more detail below represent preferred embodiments of the present invention.

Figure 1:
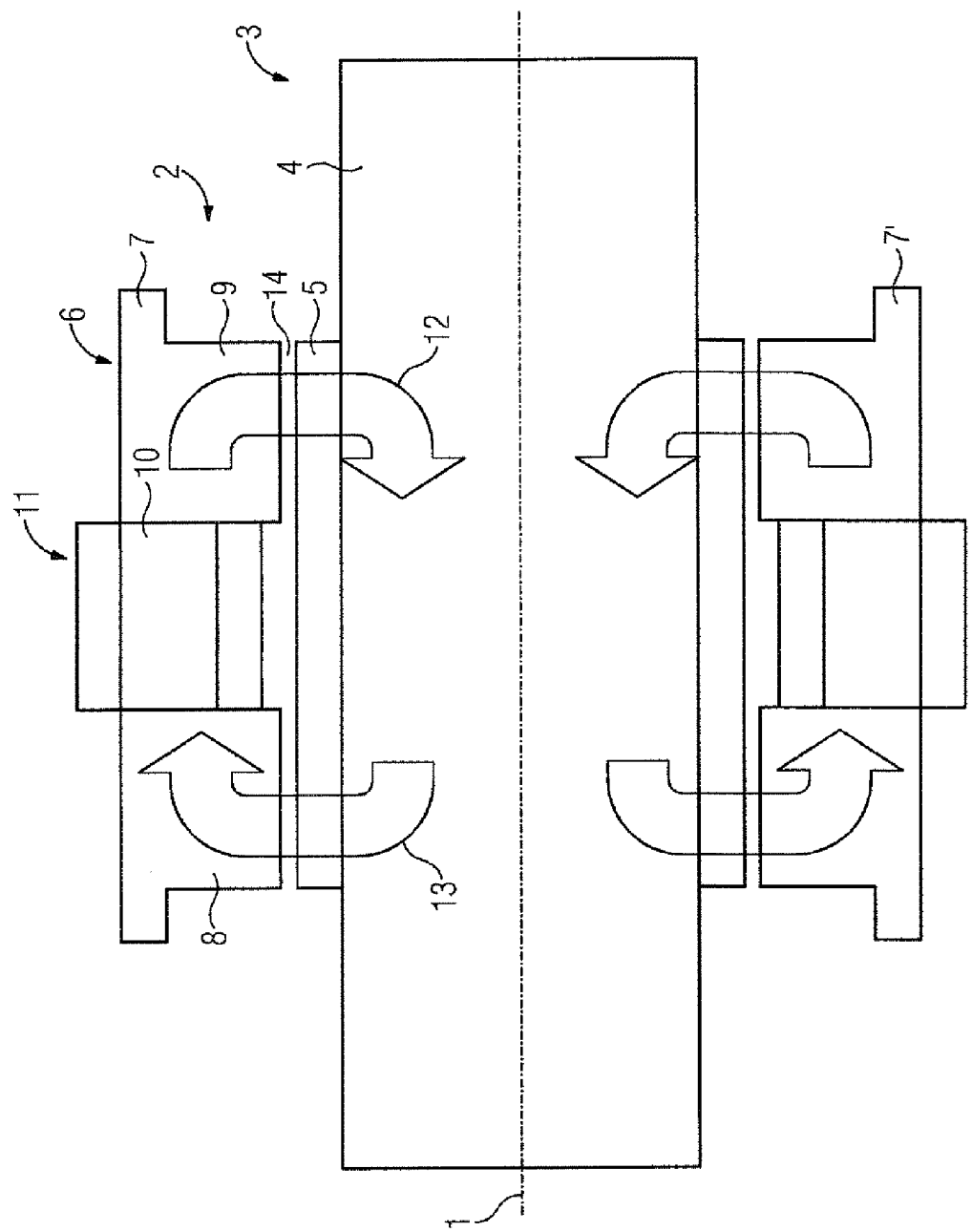
FIG. 1 the basic structure of a magnetic radial bearing according to the invention in a cross section along the axis of the radial bearing.

FIG. 1 shows the core-and-coil assembly of a magnetic radial bearing according to the invention in longitudinal section, i.e. in a section along the axis 1 of the radial bearing. The radial bearing comprises a stator 2 which is used for the rotatable mounting of a rotor 3. The rotor 3 has a shaft 4, which is surrounded in the region of the stator by a rotor lamination 5. The rotor lamination 5 has the function of keeping eddy current losses as low as possible when the magnetic field penetrates deep into the rotor due to a low number of poles. A low number of poles in turn enables a low remagnetizing frequency to be achieved.

The stator comprises several coil assemblies 6 distributed over its circumference each of which having each a laminated core 7. Each laminated core 7 has single sheets, which, relative to the middle of the laminated core, are stacked in the tangential direction of the radial bearing. The cross section of each laminated core 6 along the axis 1 of the radial bearing substantially has a U shape. This U shape represents two sides 8, 9 and a section 10 connecting the two sides. An axial field coil 11 is wound onto this connecting section 10 or the corresponding laminated core section. The axis of the axial field coil 11 extends in parallel to the axis 1 of the radial bearing.

Basic excitation of the coil assemblies 6 results, for example, in the magnetic flux indicated by arrows 12, 13 in FIG. 1 in the radial bearing. According to this, the magnetic flux indicated by the arrow 12 initially extends out of the axial field coil 11 through the side 9 of the laminated core 7. From there, it flows on through the radial air gap 14 between the stator 2 and the rotor 3. It then flows through the rotor lamination 5 and the shaft 1 and from there, as indicated by the arrow 13, in a similar way back into the axial field coil 11, Hence, in the axial field coil 11, the magnetic flux initially extends in the axial direction, is deflected in the laminated core 7 so that it flows in the radial direction through the side 9, the air gap 14 and the rotor lamination 5 substantially radially toward the interior. In the rotor 3, the magnetic flux is again deflected in the axial direction, extends underneath below the coil 11, and is deflected back into the radial direction so that it leaves the rotor 3 toward the stator 2. In the side 8 of the laminated core 7, the magnetic flux is again deflected in the axial direction. A similar magnetic flux is also produced for all the other coil assemblies 6.

Figure 2:
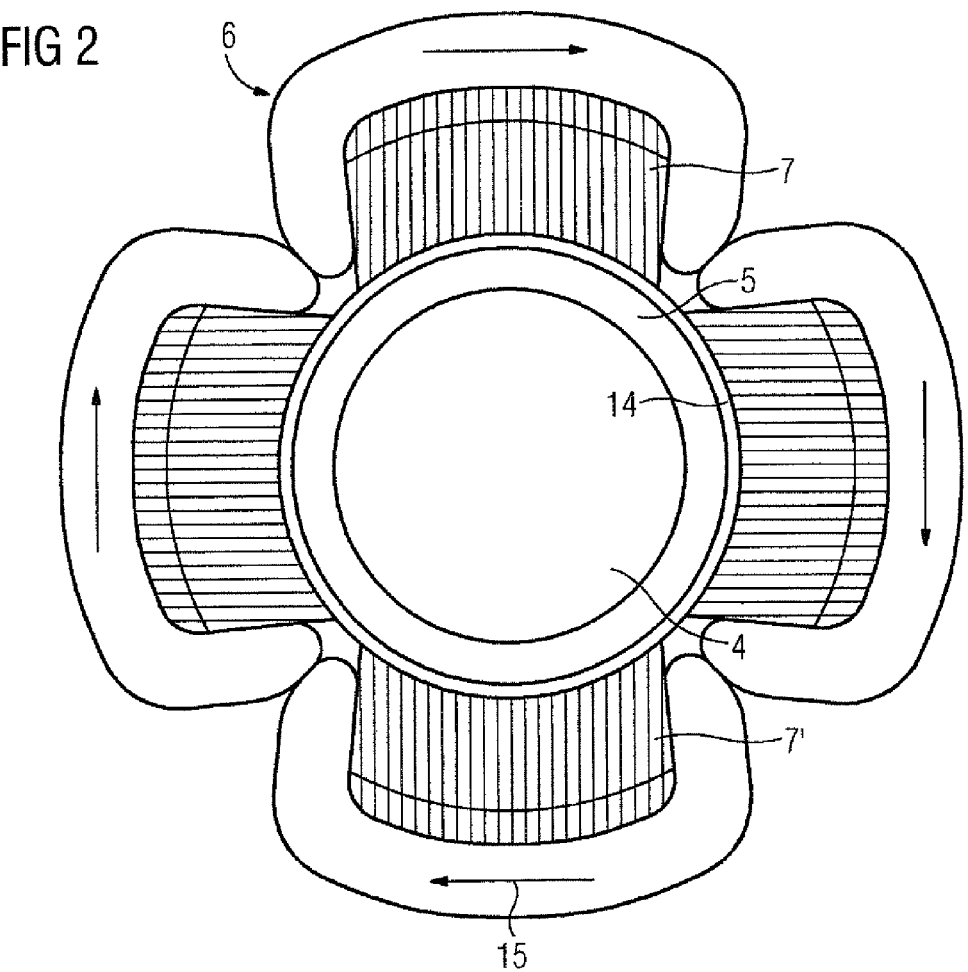
FIG. 2 a cross section through the core-and-coil assembly of the magnetic radial bearing shown in FIG. 1 transverse to the axis.

FIG. 2 shows the core-and-coil assembly in FIG. 1 in cross section perpendicular to the axis 1 of the radial bearing. Here, it is in particular possible to identify the laminated cores 7, 7' with which the single sheets are stacked in the tangential direction or in the circumferential direction.

In this example, four coil assemblies each having a laminated core 7 and an axial field coil 11 are arranged equally distributed on the circumference. This means, two of the four coil assemblies always face each other in pairs relative to the axis 1.

FIG. 2 also indicates the current direction 15 for the basic excitation in each axial field coil 11. This current direction results in the magnetic flux shown in FIG. 1.

Figure 3:
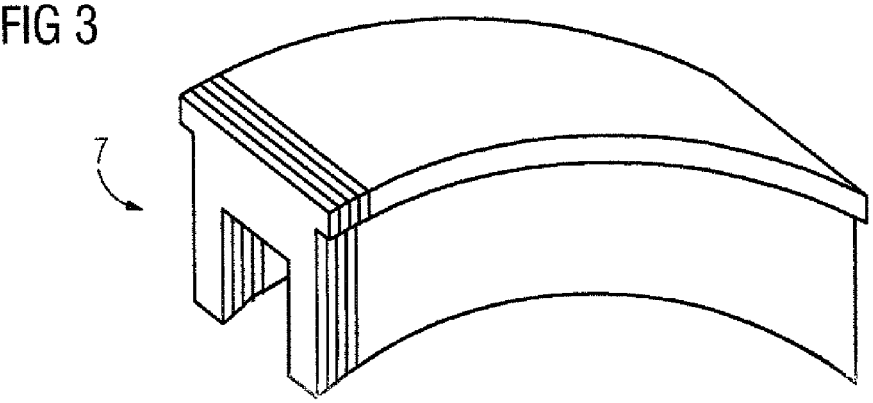
FIG. 3 a perspective view of a laminated core.

FIG. 3 is a perspective view of a laminated core 7. As mentioned, the laminated core 7 has the U-shaped cross section in the axial direction. The laminated core 7 is bent in the circumferential direction. The contour shape of the section of the laminated core facing the rotor corresponds to a circular arc section. Hence, a laminated core 7 approximately covers a 90° circle sector of the rotor 3 in the present example. The single sheets of the laminated core 7 stacked in the circumferential direction or in the tangential direction can also be identified in FIG. 3.

Figure 4:
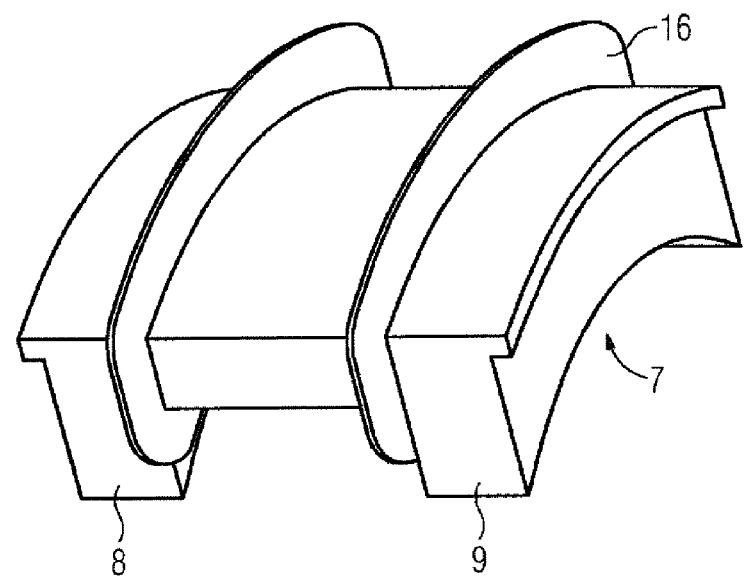
FIG. 4 the laminated core shown in FIG. 3 with a coil carrier.

In FIG. 4, the laminated core 7 in FIG. 3 is provided with a coil carrier 16, which is also known as a coil former. The coil carrier 16 is preferably made of a plastic. It can be divided into two so that it is easy to position on the laminated core 7. For example, the coil carrier 16 consists of two halves: one half lying radially outside and one half lying radially inside. These can then be plugged over the section 10 of the laminated core. Alternatively, the coil carrier 16 can also be sprayed onto the laminated core 7.

Figure 5:
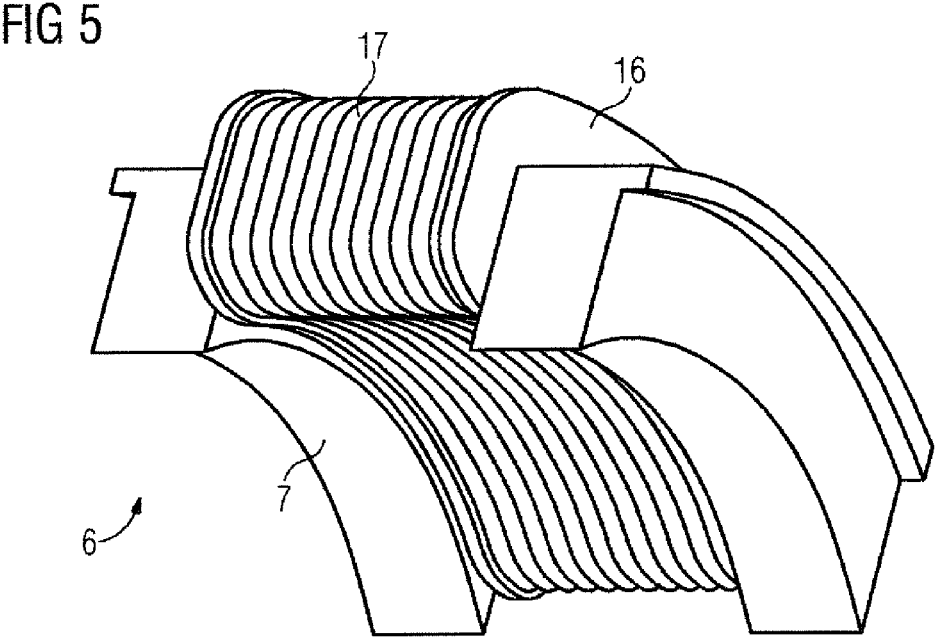
FIG. 5 the laminated core shown in FIG. 4 with a coil wound on the coil carrier thus resulting in a coil assembly.

FIG. 5 is a perspective view of a complete coil assembly 6. A coil 17 is wound onto the coil carrier 16. The axis of the coil 17 extends in parallel to the axis 1 of the radial bearing. Therefore, according to the invention, the magnetic path can constructed with low eddy currents. Namely, the four magnetic paths in the stator are laminated.

As FIG. 5 shows, the coil assembly is preferably kidney-shaped. This enables a particularly compact bearing to be achieved, as shown in the following FIGS. 6 to 8.

Figure 6:
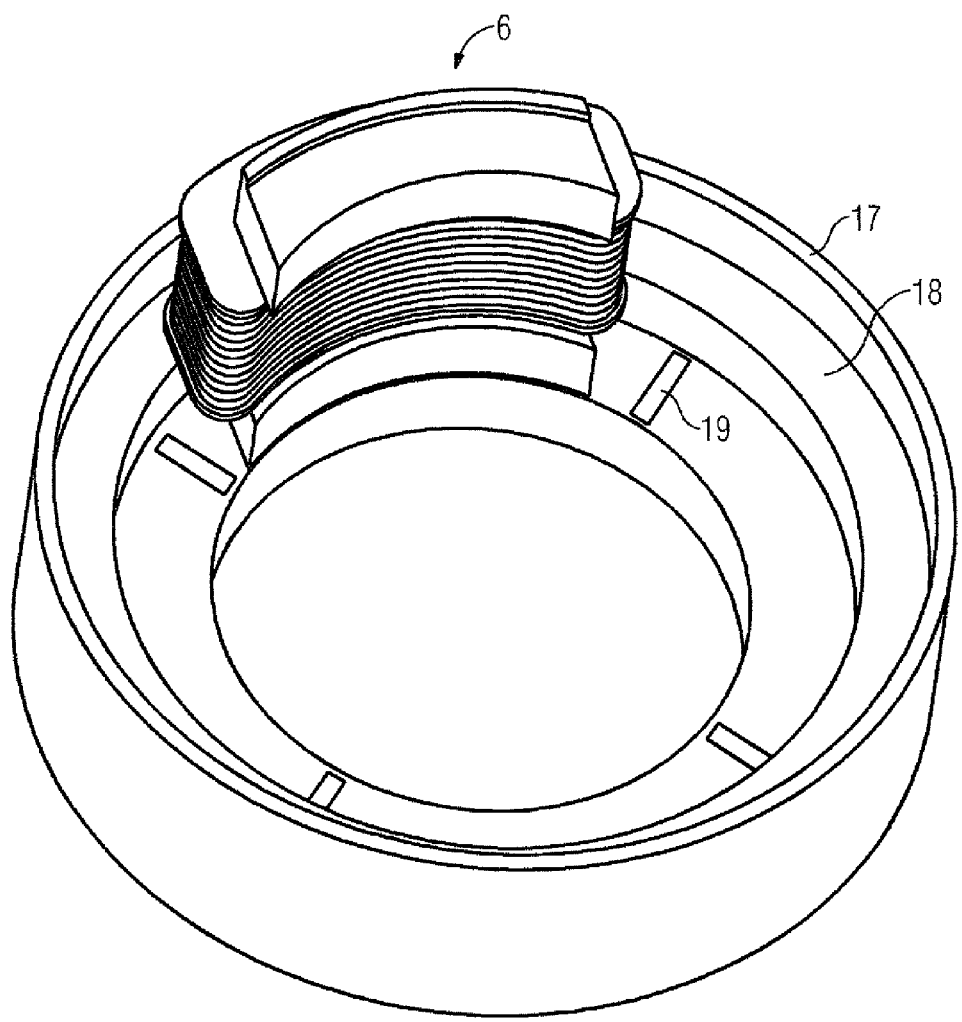
FIG. 6 the coil assembly shown in FIG. 5 used in a housing half.

FIG. 6 shows a first annular housing part 17, in which the coil assembly 6 shown in FIG. 5 is used. A shoulder 18 in the first housing part 17 holds the coil assembly 6 against an outward radial movement. In addition, in addition to the coil assembly 6, grooves 19 can be identified in the first housing part 17 said grooves being used to fix a supporting ring 20 shown in FIG. 7. The grooves 19 extend in the radial direction and end before the inner radius of the first housing part 17.

Figure 7:
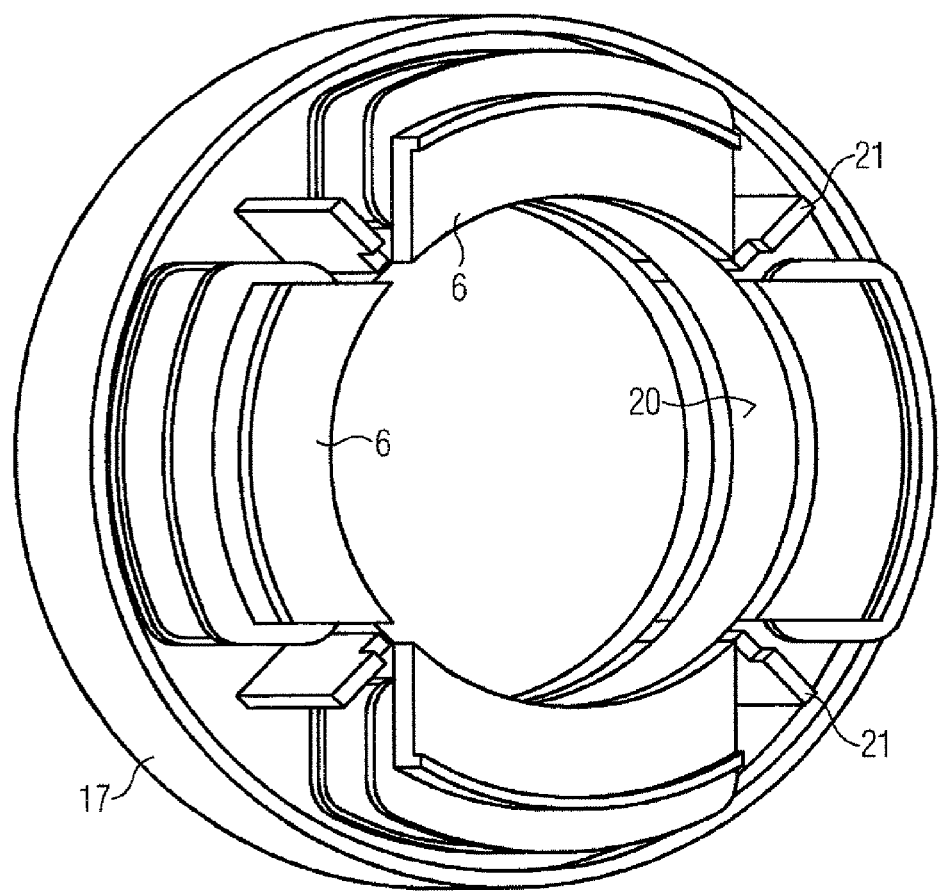
FIG. 7 the housing half shown in FIG. 6 occupied by further coil assemblies and a supporting ring.

In FIG. 7, the first housing part 17 is shown with four coil assemblies 6 distributed over the circumference. Also shown is the supporting ring 20 which is adjacent on the inside to all coil assemblies 6 and hence supports them radially toward the inside. The supporting ring 20 also has radial projecting vanes 21, which hold the supporting ring 20 in position relative to the housing by means of a positive connection. In addition, the individual coil assemblies are insulated from each other by the vanes 21 because in each case a vane 21 is located between two coil assemblies 6.

Figure 8:
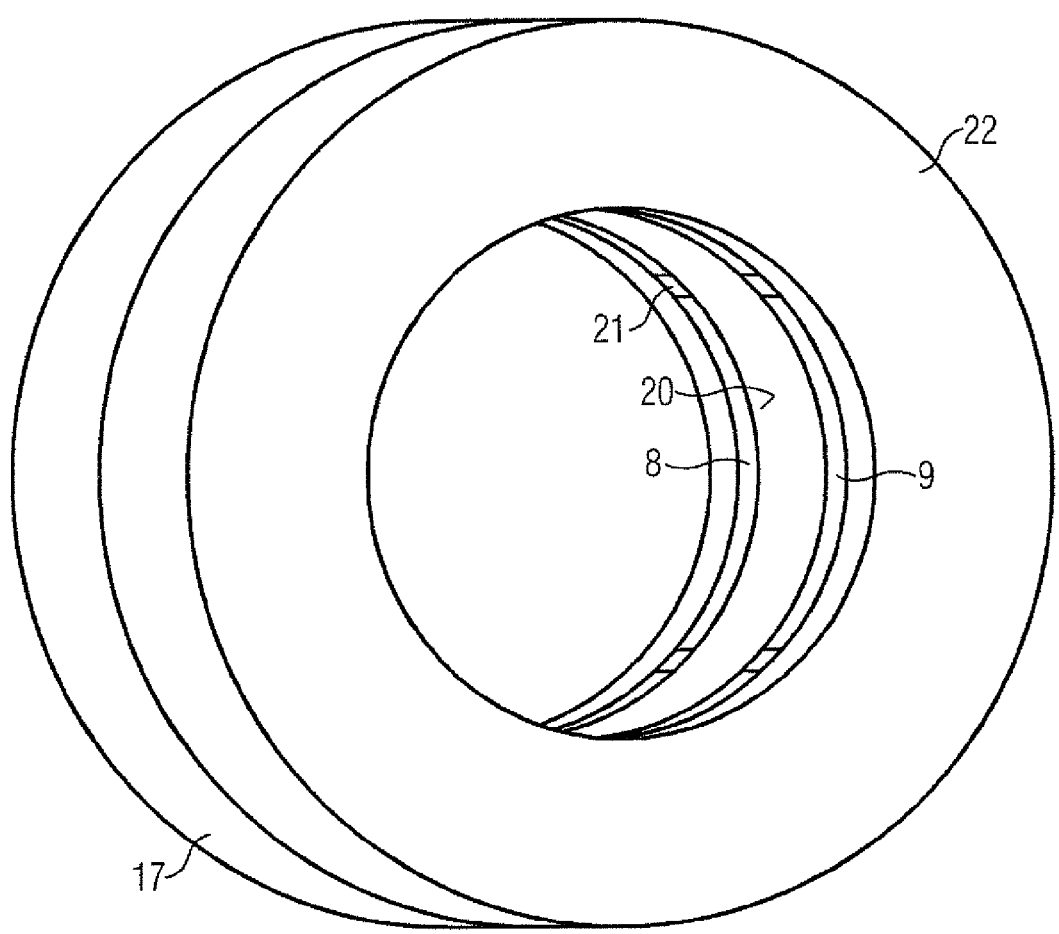
FIG. 8 the magnetic radial bearing completed with the second housing half.

FIG. 8 shows the complete magnetic radial bearing without a rotor. A second housing part 22, which can be identical to the first housing part 17, is positioned on the first housing part 17, which means the coil assemblies 6 are now covered completely. The supporting ring 20 with its vanes 21 can be identified in the interior of the annular housing, which is assembled from the two housing halves 17 and 22. The two sides 8 and 9 of the respective laminated cores are arranged flush on both sides of the supporting ring.

The design of the magnetic bearing according to the invention with the kidney-shaped coils on coil formers facilitates a particularly compact construction. The core lamination of the soft-magnetic segments enables high control quality to be achieved. All the components are preferably so shaped such that they can be fixed by simple axial joining. This ensures low-cost assembly.

The invention claimed is:

1. A magnetic radial bearing for rotatably supporting a rotor, said magnetic bearing comprising a stator having several coil assemblies which are arranged about an axis of the radial bearing in a circumferential direction, each of the coil assemblies including a laminated core with single sheets and a coil which is wound about the laminated core and configured as an axial field coil, said single sheets of the laminated core being stacked in the circumferential direction, and each of the coil assemblies and also each of the laminated cores and each of the coils provided in each of the coil assemblies have a kidney-shaped form with radially outwardly curved radially inner and radially outer surfaces, so that each of the kidney-shaped coils is wound about each of the kidney-shaped laminated cores in each of the coil assemblies, an annular housing in which the coil assemblies are secured, and a separate supporting ring attached to an inner circumference of the annular housing and configured to radially support the coil assemblies from inside, and the supporting ring is provided with radial projecting vanes which hold it in position relative to the housing by a positive connection with the housing and insulate the coil assemblies from each other by location of one of the vanes between two of the coil assemblies.

2. The magnetic radial bearing of claim 1, wherein the stator has four of said coil assemblies facing each other in pairs.

3. The magnetic radial bearing of claim 1, wherein the laminated core has in an axially extending cutting plane a U-shaped cross section having two sides and a section connecting the sides and having portions extending outwardly beyond the sides, said coil being wound about a part of the laminated core in a direction perpendicular to the axis of the radial bearing, said part being assigned to the section.

4. The magnetic radial bearing of claim 1, wherein the laminated core has an arched configuration in the circumferential direction.

5. The magnetic radial bearing of claim 1, wherein each of the coil assemblies comprises a coil carrier arranged around the laminated core.

6. The magnetic radial bearing of claim 5, wherein the coil carrier is separable.

7. The magnetic radial bearing of claim 5, wherein the coil carrier is sprayed onto the laminated core.

8. The magnetic radial bearing of claim 1, wherein the housing is made of two parts, each of the two parts of the housing having an annular shape, and the two parts are configured as identical and cup-shaped parts.

9. The magnetic radial bearing of claim 1, wherein in each of the coil assemblies and also in each of the laminated cores and in each of the coils provided in each of the coil assemblies having a kidney-shaped form the radially outwardly curved radially inner and radially outer surfaces are connected with one another by rounded convex transitions.

* * * * *